Inventor
FRANK WHITTLE

Sept. 8, 1970                   F. WHITTLE                  3,527,511
SEALS BETWEEN ROTATING PARTS
Filed July 17, 1969                                            2 Sheets-Sheet 2
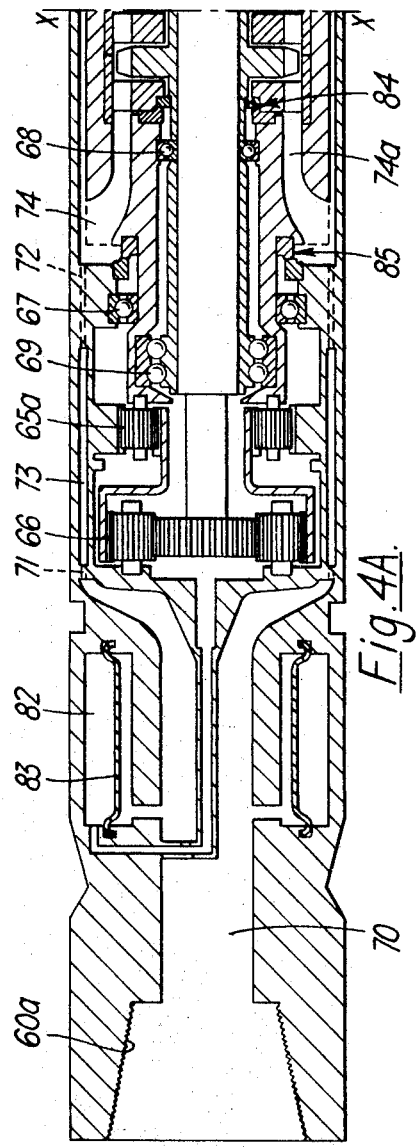
*Inventor*
FRANK WHITTLE
By
Jennings Bailey, *Attorney*

United States Patent Office 3,527,511
Patented Sept. 8, 1970

3,527,511
SEALS BETWEEN ROTATING PARTS
Frank Whittle, Walland Hill, Chagford,
Devonshire, England
Continuation-in-part of application Ser. No. 381,832,
July 10, 1964. This application July 17, 1969,
Ser. No. 842,544
Claims priority, application Great Britain, July 12, 1963,
27,753/63
Int. Cl. F16c *33/78;* F16j *15/54*
U.S. Cl. 308—187     3 Claims

ABSTRACT OF THE DISCLOSURE

In a fluid-tight seal between two relatively rotatable parts, e.g., in down-the-hole rock drills, each part carries a sealing element able to shift axially a limited distance. The elements are urged together into face contact by springs. The preloadings and rates of the springs are selected to maintain contact of the faces when major axial shocks occur, e.g. 10g acceleration of the parts.

CROSS REFERENCE TO RELATED APPLICATION

This application is a continuation-in-part of my application No. 381,832, filed July 10, 1964, now Pat. No. 3,460,844.

BACKGROUND OF THE INVENTION: FIELD OF THE INVENTION

The invention relates to mechanical seals for preventing passage of pressurised fluid between relatively rotatable parts in apparatus susceptible to axial shock loading, for example in rock drilling equipment.

BACKGROUND OF THE INVENTION: PRIOR ART

There is a known kind of mechanical seal, comprising relatively rotatable first and second parts, relatively rotatable first and second sealing elements with cooperating primary sealing faces which are separable by relative axial movement of the sealing elements, means restraining each element from rotation relative to a respective one of the parts, and secondary sealing means, each including a secondary seal and a cooperating secondary sealing surface, acting between each sealing element and its respective part. In such seals one of the sealing elements is usually mounted for free axial movement, and the elements are pressed together with their primary sealing faces in contact with one another by springs or magnetic attraction, and the force may be augmented by pressure derived from the fluid being contained.

When used in apparatus susceptible to severe shock loading, for example rock drilling equipment for sinking oil wells, there is a possibility of the sealing elements becoming momentarily separated by transmitted shocks.

In French Addition No. 67,869 to Pat. No. 1,077,755, and in Australian Pat. 207,914, there are disclosures of seals of this known kind in which both sealing elements are able to move axially relatively to the parts through a limited range of axial travel, and there are springs acting axially between each sealing element and its respective part for urging the primary sealing surfaces into contact with one another. The purpose of the springs in these disclosures is to hold the sealing elements in contact at times when there is no pressure difference across the seal. When a pressure difference is established, this pressure difference itself provides the principal force urging the primary sealing faces into contact. Hence, as is stated in the patents, the springs are designed to exert a relatively light pressure. These patents contain no consideration of the problems of axial shocks, nor any disclosure of how to meet such problems.

SUMMARY OF THE INVENTION

It is an object of the present invention to provide a mechanical seal, having sealing faces which remain in sealing contact and are substantially immune to axial shock loading.

The invention relates to seals which are of the known kind mentioned above and in which furthermore both sealing elements are located relatively to the parts with a limited range of axial travel of both elements, and there are springs acting axially between each sealing element and its respective part for urging the primary sealing faces into contact with one another.

According to this invention the preloading and rates of the springs are such that, when the elements are at an extreme of the axial travel, the difference between spring loads on the two elements imparts to the elements a net force towards the middle of the travel equal to a predetermined multiple of the sum of the weights of the two elements, while the lesser of the two spring loads is greater than the same multiple of the weight of that element on which that lesser load acts.

The invention ensures that when axial shocks occur, within the severity for which the seal has been designed, the primary sealing faces are maintained in contact, without the briefest separation occurring.

In a down-the-hole rock drill, axial shocks may be experienced which involve axial acceleration of the parts up to about 10g, with occasional greater or repeated shocks. For usage in such a situation, a seal according to this invention should have preloading and rates of the springs such that the "predetermined multiple" is about 10.

These and other features of the invention are illustrated by the example shown in the accompanying drawings.

BRIEF DESCRIPTION OF THE DRAWINGS

In the drawings:

FIGS. 4A and 4B, joined at the lines X—X, form a diagram showing the location of the seal assembly in the down-the-hole motor.

DESCRIPTION OF THE PREFERRED EMBODIMENT

Figure 1:
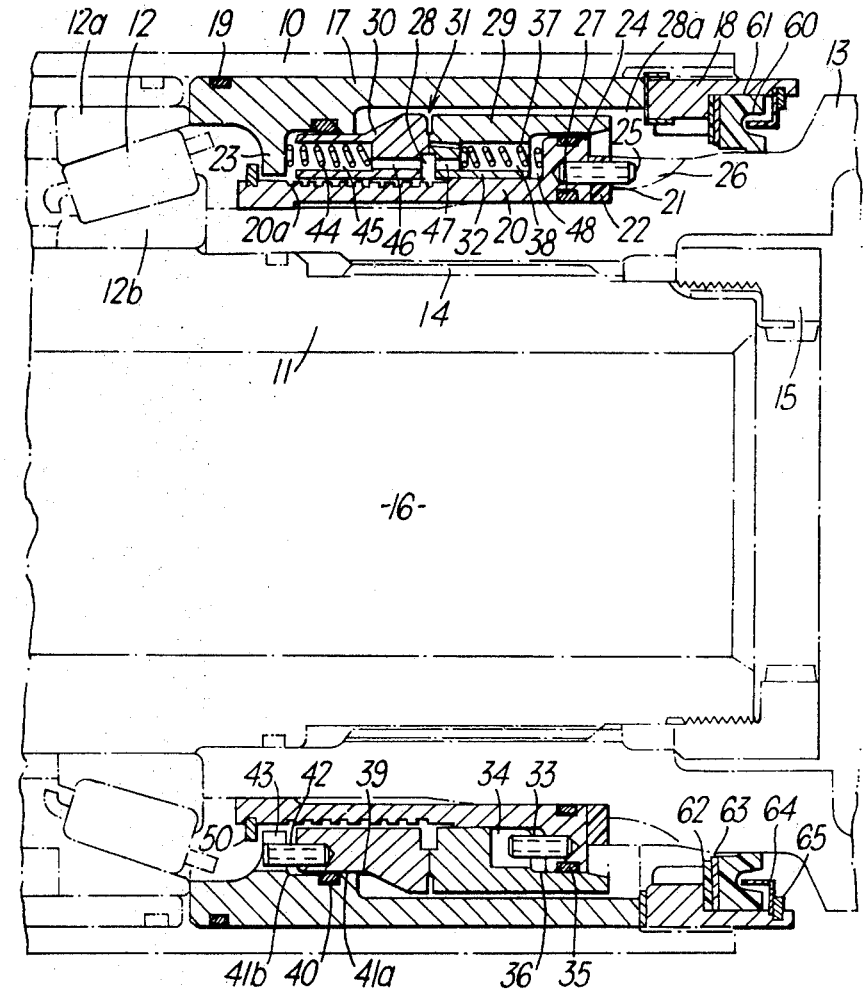
FIG. 1 is a section passing through the axis of a seal assembly mounted between the casing and output shaft of a motor for drilling oil wells, the motor parts being shown in chain-dot lines. The axis is of course vertical during normal operation, the assembly being drawn in a horizontal position for convenience.

As shown in FIGS. 4A and 4B, the down-the-hole motor, drawn in horizontal position for convenience, includes a casing 10 which in use is coupled at 60a to a drill string, and an ouput shaft 11 which in use is coupled at 61a to a drill bit. A mud-driven multi-stage turbine is constituted by rings of blades 62a carried by the shaft 11, and rings of blades 63a carried by an inner shaft 64a. The two shafts 11, 64a are geared to one another and to the casing 10 by two stages of epicyclic gearing 65a, 66.

The thrust of the drill is transmitted by a main double taper roller bearing 12 between the output shaft 11 and the casing 10. The shaft 11 is also aligned by a bearing 67, and the inner shaft 64a is located by bearings 68 and 69.

Mud to operate the turbine is supplied at high pressure in known manner down the drill string into a central bore 70 in the casing 10, passes through ports 71, 72 and an annular passage 73 around the gearbox into a space 74, and then enters the turbine through ports 74a. After passing through the turbine, the mud passes through a bore 75 in the shaft 11, to the drill bit, and returns from the tool through the bore hole, i.e. the annular clearance between the outside of the casing 10 and the wall of the bore hole. The bearing 12 runs in lubricating oil which is maintained at an internal pressure greater than the external pressure of the drilling mud in the bore hole, and escape of this oil has to be prevented by sealing assemblies 76 and 77 between the casing 10 and the shaft 11. It is the sealing assemblies 76 and 77 which are constructed in accordance with the present invention. The assembly 76 is described in detail below.

The lubrication system associated with the bearing 12 includes a reservoir 78 having a flexible wall 79, the other face of which is exposed to the pressure of mud from the space 74 upstream of the turbine, derived through a clearance 80 between the shaft 11 and the casing 10, and ports 81. In practice, the oil pressure may exceed the external mud pressure by up to 2000 p.s.i. (which is the pressure drop across the turbine plus pressure drop across the bit nozzle) the external pressure being the hydrostatic pressure at the hole bottom.

The bearings 67, 68 and 69, and the gearing 65a, 66 are all lubricated by oil in a second system, which includes a reservoir 82 with a flexible wall 83 subjected to mud pressure from the bore 70. Escape of oil from this second system is prevented by sealing assemblies 84 and 85.

Figure 2:
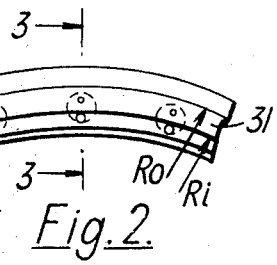
FIG. 2 is a view on part of the primary sealing face of one of the sealing elements.
Figure 3:
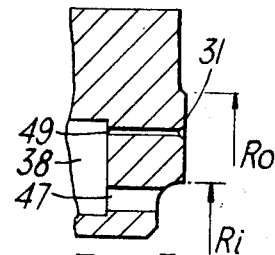
FIG. 3 is an enlarged cross-section corresponding to the line 3—3 in FIG. 2.

The sealing assembly 76 is shown in detail in FIGS. 1 to 3. It comprises an outer sleeve 17 which is locked firmly in the casing against the outer race 12a of the bearing 12 by a locking ring 18, an O ring 19 being provided to prevent leakage at the interface, and an inner sleeve 20 which is slidably mounted on an external surface of a coupling member 13. (This coupling member is shown in FIG. 1. In FIG. 4B, which is a diagram, the coupling member is shown as if integral with the shaft 11.) The sleeve 20 lies between a shoulder 21 on the coupling member 13, and the inner race 12b of the bearing 12, a washer 22 of a resilient material, for example a polyamide, being preferably interposed to reduce shock transmission. An axial clearance is allowed between the sleeve 20 and the inner race of the bearing 12 with the washer 22 uncompressed, to ensure that the axial retaining force on the bearing race is transmitted through the coupling member 13, and to allow freedom of axial movement of the sleeve 20 relative to the sleeve 17 for a purpose described below. The outer sleeve 17 has at its end (i.e. its left hand end as seen in the drawing) a radial flange 23 projecting inwards towards the inner sleeve 20, while the latter has at its lower end a radial flange 24 projecting outwards towards the outer sleeve 17. The inner sleeve is prevented from rotating relatively to the coupling member 13 by a number of dowels 25 engaging slots 26 in the coupling member, and leakage is prevented by an O ring 27. The flanges 23 and 24 and the sleeves together substantially enclose a cavity 28 in which are mounted a sealing element 29 which rotates with the inner sleeve 20 and shaft 11 and a sealing element 30 which is non-rotatable relatively to the outer sleeve 17 and the casing 10, the flanges acting as abutments to limit the range of axial travel of the sealing elements and to prevent their escape from the cavity 28. In this example the range of travel is 0.160 inch between the abutments. The sealing elements have similar but oppositely directed primary sealing faces 31 the form of which will presently be described in more detail.

The rotating sealing element 29 has an inner cylindrical bore 32 by which it is located on the inner sleeve 20 with freedom to slide axially, rotation relatively to the sleeve being prevented by a number of dowels 33 (see the lower half of FIG. 1) mounted in the flange 24 and engaging slots 34 in the sealing element 29. The flange 24 also has a peripheral groove housing a secondary seal O ring 35 which engages a cylindrical bore 36 in the sealing element 29. A number of springs 37 housed in bores 38 (see the upper half of FIG. 1) and reacting against the flange 24 urge the sealing element 29 upwards towards the other element. The outer periphery of the element 29 has a clearance spacing from the sleeve 17. This is shown exaggerated in the drawing, the clearance preferably being kept as small as possible, subject to avoiding constraint, so as to improve dissipation of heat to the sleeve 17 and the casing 10.

The non-rotating sealing element 30 has an outwardly facing cylindrical secondary sealing surface 39, by which it is slidably located in a bore in the outer sleeve 17, an O ring 40 being interposed to provide a secondary seal. The bore preferably comprises a short outer part 41a (see the lower half of FIG. 1) which has only slight celarance upon the surface 39, and an inner part 41b which has increased clearance. This ensures accurate centering of the sealing element 30 but allows it to tilt to a small extent to follow any slight deviations of the primary sealing face of the rotating element from exact perpendicularity. Here again the clearance at 41b is kept to a minimum to improve heat dissipation. Just sufficient clearance is provided between the inner surface of the sealing element 30 and the inner sleeve 20 to allow the tilting action to take place. Alternatively however the element 30 may be accurately journalled on the sleeve 20, together with the rotating element 29, and steps taken during manufacture to ensure proper face-to-face contact of the primary sealing surfaces 31. In this case the part 41a of the bore in the outer sleeve 17 is of course a clearance fit in relation to the secondary sealing surface 39. The element 30 is prevented from rotating in the outer sleeve by a number of dowels 42 carried by the element and projecting into slots 43 in the flange 23. Springs 44 housed in bores 45 in the element 30 and reacting against the flange 23 urge the element into contact with the other element 29. As described more fully below, the two sets of springs are selected, to position the elements normally at about the middle of their range of axial travel, to resist axial shocks, and to provide an adequate sealing pressure between the elements in the absence of internal oil pressure.

Passages 46 are provided in the axial direction through the element 30 and further passages 47 through the element 29 provide communication to the space 48 between the flange 24 and the element 29. The full oil pressure from the neighborhood of the bearing 12 consequently acts on radially inner parts of both end faces of both of the elements. The radially outer parts of the end faces of the elements are exposed to the pressure of fluid in the space 28a which lies between the sealing elements 29, 30 and the outer sleeve 17. This space is separated from the outside of the casing by a seal 60 of the lip type, made of elastomeric material, mounted in a recess 61 formed in the locking ring 18. A resilient washer 62 and a metal backing plate 63 are interposed between the base of the recess and the seal, and the latter is held in place by an angle section spacing ring 64 and a spring retaining ring 65. This seal 60 is solely to resist mixing of the fluids on its two sides and it does not withstand any substantial pressure difference. Hence the pressure in the space 28a, which acts on the outer parts of the sealing elements, is substantially equal to the pressure of the mud in the borehole. Initially the space 28a is filled with oil. However, axial movements of the sealing elements would permit some mud to seep past the seal 60 into the space 28a. This can be avoided, though with some additional complication, by providing a flexible oil reservoir in communication with the space 28a, as described in U.S. Pat. No. 3,395,955. This reservoir is shown at 86 in FIG. 4B.

Preferably, as discussed more fully later, the secondary sealing surfaces 36 and 39 are of equal radius, and this is so in this example. Consequently the difference between the internal (oil) pressure and the external (mud) pressure exerts no net axial hydraulic force tending to move the sealing elements axially as a pair. The position of the sealing elements is controlled entirely by the two sets of springs 37 and 44.

The particular preloading and rates of the springs used in this example will now be described. In this example, the overall diameter of the casing 10 is 8 inches. This particular example is designed to withstand shocks causing upward accelerations of the casing 10 and shaft 11 not exceeding 10g, and occasional greater or repeated shocks, as explained below.

There are 24 springs in each set. Each spring has a rate of approximately 16 lbs./in. Each of the elements weighs about 3½ lbs.

The springs are preloaded to about 5 lbs. each, i.e. 120 lbs. per set. In fact, with the assembly in use with its axis vertical, the total preload of the lower set of springs 37 must exceed the total preload of the upper set of springs 44 by 7 lbs., to balance the total weight of the sealing elements. The preload is most conveniently selected by using springs of predetermined unstressed length, in this example 1.2 inches, and then selecting the axial lengths of the bores 38 and 45. This choice of lengths of bores will also determine the normal position of the sealing elements in relation to the two ends of the range of travel. In this example the normal position is somewhat above the middle of the range, giving a possible downward movement of 0.96 inch and an upward movement of 0.64 inch.

The movement of the sealing elements to their downward extreme of axial travel produces a total restoring force of about 74 lbs., that is to say more than 10 times the total weight of the sealing elements. Consequently upward accelerations not exceeding 10g can be transmitted to the sealing elements without the elements reaching the end of their axial travel. Hence there is no jarring of the sealing elements under such conditions.

Furthermore, in the downward extreme position, the downward force of the springs 44 on the upper element 30, though reduced from the preload, is still about 79 lbs., which is considerably more than 10 times the weight of the element 30 alone. The significance of this is that occasionally there may be shocks exceeding the designed value of 10g, or there may be two shocks in quick succession. On such occasions the lower sealing element 29 may strike the flange 24. This will tend to make the upper element 30 bounce away from the lower element. The force remaining in the springs 44 in the downward extreme position will resist such bouncing. Thus the primary sealing faces are maintained in contact, without the briefest separation occurring.

The seal is also designed to withstand downward accelerations of the casing and shaft not exceeding 7g and occasional greater or repeated shocks. The values of 10g and 7g respectively have been found to correspond with conditions experienced in practical drilling.

The total axial travel of the sealing element is determined by the space available in the drill, both to accommodate the travel and to accommodate the springs, and by the need to avoid excessive sliding of the secondary O-ring seals 35 and 40.

If the springs were given less stiffness than described, then there would be the likelihood of frequent striking of the lower sealing element 29 on the flange 24, and the elements will more readily bounce apart as described hereinbefore.

If the springs were given less preloading than described, then the reduced loading in the springs 44 at the downward extreme of travel would be insufficient to resist occasional bounce of the upper element 30. This would permit some escape of oil. Also, any grit in the space 28a may get between the primary sealing surfaces. This could be very serious, because the operation of the drill depends absolutely on maintenance of oil supply for the lubricated bearing 12. The lip seal 60 cannot be 100% effective in preventing grit reaching the space 28a. If leakage becomes possible between the primary sealing surfaces, the large pressure difference will cause leakage flow, which the lip seal 60 in series with the sealing assembly is not able to resist. All the oil in the reservoir 78 will escape, and rapid wear of the bearing 12 will then occur, terminating operation of the drill.

If the springs were given greater stiffness than described, there would be no advantage, but the risk of occasional heavy or repeated shocks leading to the springs 44 becoming insufficiently loaded with the lower element 29 reaching the flange 24. Very stiff springs would themselves transmit jarring to the primary sealing surfaces.

If the springs were given greater preloading than described, there would be greate friction at the primary sealing faces, giving rise to greater wear and to more heat requiring to be dissipated.

The pressure difference across the seal is so great that any difference in the radii of the secondary sealing surfaces would give rise to a large net fluid pressure force in one direction on the sealing elements, considered as a pair, which would override the spring forces. Therefore care is taken to make the secondary sealing surfaces of equal radii.

Each of the sealing elements individually experiences axial hydraulic forces on its two ends. During normal operation, when the internal oil pressure is greater than the external mud pressure, there is a tendency for the oil pressure to penetrate between the primary sealing surfaces. In order to ensure that, despite this tendency, there is a hydraulic closing force, i.e. a net hydraulic force on each element towards the other, the primary sealing faces 31 (see FIG. 2) extend inwardly from an outer radius Ro which is substantially equal to the radius of the secondary sealing surfaces 36 and 39, to a smaller inner radius Ri.

Oil is circulated to the vicinity of the primary sealing faces 31 by the action of helical or other grooves 20a on the inner sleeve 20. The oil returns through the passages 46. This circulation assists dissipation of heat from the primary sealing faces.

Lubrication of the primary sealing surfaces may be improved by providing small bore oil supply passages 49 opening into about the middle of the width of the sealing surfaces.

As just explained, while the internal pressure is greater than the external pressure, which is the case during the normal drilling mode of operation, there will be a hydraulic closing force on the sealing elements. When the external pressure is greater than the internal pressure, however, which is the case when the drill string is being lowered into the borehole, there will be a hydraulic force tending to separate the sealing elements. At low values of this hydraulic separating force, the preloading of the springs 37, 44 is more than sufficient to prevent separation, and also to resist superimposed shocks, for example caused by the boring tool catching against the wall of the bore hole as the drill string is being lowered.

To deal with higher values of the hydraulic separating force, the sleeve 20 is arranged to slide axially, and there is a gap between the sleeve 20 and the bearing race 12b of greater axial dimension than the total travel of the sealing elements.

When the external pressure is considerably greater than the internal pressure, the external pressure on the lower surface of the flange 24 will push the sleeve 20 axially until the sealing elements are clamped against the flange 23. The radial extent of the sleeve, between the seals 35 and 27, is such that the net hydraulic force on the sleeve rises to a value sufficient to compress the springs 37 and 44 in series, before there is any tendency for the pressure difference to separate the primary sealing faces. This clamping action comes into play in situations in which no rotation is occurring, so an increased force on the primary sealing faces does not matter. In practice the clamping force may be 3 or 4 times the force initially exerted by each set of springs. The worst condition to be designed for, which may arise if passages or filters become blocked, is an external mud pressure 1000 p.s.i. greater than the oil pressure.

In normal operation, when the internal pressure is greater than the external pressure, the sliding sleeve 20 is pushed into contact with the resilient washer 22 by the hydraulic pressure on the upper surface of the flange 24, and the sealing elements are then suspended by the springs between the flanges 23 and 24, and the clamping forces on the elements are derived from spring pressure and hydraulic pressure, as described above.

Using this arrangement there is thus no leakage between the primary sealing faces, whichever of the external or internal pressures is greater.

In conjunction with this movable sleeve 20, it may be advantageous to have a flexible oil reservoir communicating with the space 28a, as described in U.S. Pat. 3,395,955, mentioned above, and as illustrated at 86 in FIG. 4B.

The presence of the secondary O-ring seals 35 and 40 necessarily introduces some friction resisting movement of the sealing elements 29 and 30. This is helpful in that it exerts a damping action when axial shocks occur, but the choice of size of O-ring should be such as to introduce no more friction than is unavoidable, because greater friction causes the O-rings to wear out more quickly.

It should be noted that, during normal operation, a hydraulic force, the value of which is dependent upon the radius of the secondary sealing surface 36, acts downwardly upon the inner sleeve 20 in opposition to the thrust of the drill bit, and therefore relieves the bearing 12 of at least part of its thrust loading. This is an advantage of arranging that the full pressure drop across the turbine and the bit nozzle also acts across the seal assembly 76. Obviously it is desirable that this hydraulic force should balance the bit load as nearly as possible, but the bit load is a variable quantity dependent upon the nature of the rock being drilled. The seal assembly is therefore designed for easy replacement, as a unit, alternative units with secondary sealing faces 36 of different radii being provided so that the most appropriate unit for the type of rock to be drilled can be selected. The unit nature of the seal assembly is obtained by the arrangement of the outer and inner sleeves 17 and 20 which with their radial flanges 23 and 24 substantially enclose the sealing elements 29 and 30 and their associated parts, endwise separation of the sleeves after assembly of the unit being prevented by a clip 50 (see the lower half of FIG. 1) sprung into a groove in the inner sleeve 20 where it will abut the flange 23. The removal and re-fitting of a sealing assembly does not therefore involve separation of the sealing elements 29 and 30, which would involve a risk of their finely finished primary sealing surfaces 31 becoming damaged. Even in cases in which frequent exchange of a seal assembly will not be required, the unit nature of the assembly has the advantage of permitting the whole unit to be run-in and tested and then installed without being dismantled. This feature is claimed in my application No. 381,832, referred to above, of which the present application is a continuation-in-part.

It is not essential for the primary sealing faces to be flat; they may alternatively be part-spherical or conical.

In the example shown, the secondary sealing surfaces are on the sealing elements and the secondary seals are mounted in the inner and outer sleeve. Converse arrangements are also possible, with one or both of the secondary seals mounted in the sealing elements, and one or both of the secondary sealing surfaces on the sleeves.

In this particular example, there is geared drive and a very high pressure drop. As explained above, this necessitates secondary sealing surface of equal radius. In simpler drill motors using direct drive, smaller pressure drops may occur, e.g. 200 to 500 p.s.i. It is then possible for the secondary sealing surfaces to differ slightly in radius, the resultant hydraulic force being balanced by altering the strengths of the springs, but there is no particular advantage in doing this, and a difference in radii greater than 0.030 inch is not advised.

The seals according to the present invention have been described in relation to a particular kind of down-the-hole drill motor because they contribute significantly to the success of that motor. An important feature of the motor is the use of conventional rolling bearings, in particular as the main thrust bearing 12 for the output shaft 11, in contrast to most previous drill motors which use rubber bearings. Rubber bearings can be lubricated by mud, whereas conventional rolling bearings require oil lubrication. But oil-lubricated bearings on the output shaft give high mechanical efficiency and the ability to stand greater bit weights and high hydraulic end load without the need for fine manipulation of the balance of bit weight to hydraulic load during any phase of drilling. Also stalling of the turbine does not damage oil-lubricated rolling bearings when the bit starts turning again. This is superior to the normal rubber bearings. The reliability of the bearings is wholly dependent however on the reliability of the seals which prevent loss of oil on entry of grit into the oil.

A reliable bearing means that under normal circumstances the drill should not have to be pulled out for bearing examination between "round trips" to replace worn bits. This is a major commercial advantage since round tripping takes time and costs money. It has been found possible to operate a motor as described above for 100 hours between inspections. This is a very good performance under the arduous conditions of rock drilling.

Referring again to FIGS. 4A and 4B, of the four sealing assemblies, it is the assembly 76 which is subjected to the most arduous conditions, in that it is nearest to the bit where the shocks originate, the mud outside it contains grit produced by the cutting action of the bit, and there is a possibility of major reversal of pressure difference across this sealing assembly at the various stages of operation of the drill.

The sealing assembly 77 has the same shock-resisting construction in accordance with this invention, that is to say is the same as the sealing assembly 76, except that there is no auxiliary lip seal 60, and the sleeve 20 does not slide, because the assembly 77 is not subject to major presure reversal.

The sealing assemblies 84 and 85 are not in accordance with this invention. They are relatively remote from the shock source and have sufficient damping through the internal structure of the drill.

Although the seals have been described in relation to down-the-hole drill motors, they may be used in any other situation in which resistance to axial shocks is of importance, for example in pumps.

1 claim:

1. A combination of relatively rotatable first and second parts, relatively rotatable first and second sealing elements with cooperating primary sealing faces which are separable by relative axial movement of the sealing elements, means locating the elements relatively to the parts with a limited range of axial travel of both elements and with each element restrained from rotation relative to a respective one of the parts, secondary sealing means, each including a secondary seal and a cooperating secondary sealing surface, acting between each sealing element and its respective part, and springs acting axially between each sealing element and its respective part for urging the primary sealing faces into contact with one another, the preloading and rates of the springs being such that, when the elements are at an extreme of the axial travel, the difference between spring loads on the two elements imparts to the elements a net force towards the middle of the travel equal to a predetermined multiple of the sum of the weights of the two elements, while the lesser of the two spring loads is greater than the same multiple of the weight of that element on which that lesser load acts.

2. A combination according to claim 1 in which the predetermined multiple is about 10.

3. In a down-the-hole motor for rock drilling, including a mud-operated turbine coupled to an output shaft journalled in a motor casing by an oil-lubricated thrust bearing, and a seal between the output shaft and the casing serving to separate the oil from mud at a greatly different pressure, the improvement constituted by the said seal consisting of a combination according to claim 1.

References Cited
FOREIGN PATENTS 207,914   5/1954   Australia.

FRED C. MATTERN, Jr., Primary Examiner

F. SUSKO, Assistant Examiner

U.S. Cl. X.R.

277—93

UNITED STATES PATENT OFFICE
CERTIFICATE OF CORRECTION

Patent No. 3,527,511             Dated September 8, 1970

Inventor(s)   Frank Whittle

It is certified that error appears in the above-identified patent and that said Letters Patent are hereby corrected as shown below:

In the specification, at the heading, change the inventor's name from Frank Wittle to Frank Whittle.

SIGNED AND
SEALED
DEC 15 1970

(SEAL)
Attest:

Edward M. Fletcher, Jr.
Attesting Officer

WILLIAM E. SCHUYLER, JR.
Commissioner of Patents